(12) United States Patent
Kennedy et al.

(10) Patent No.: US 10,793,661 B2
(45) Date of Patent: *Oct. 6, 2020

(54) SYNTHESIS OF STAR ISOBUTYLENE-BASED THERMOPLASTIC ELASTOMERS

(71) Applicant: THE UNIVERSITY OF AKRON, Akron, OH (US)

(72) Inventors: Joseph P. Kennedy, Akron, OH (US); Turgut Nugay, Istanbul (TR); Nihan Nugay, Istanbul (TR)

(73) Assignee: THE UNIVERSITY OF AKRON, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,091

(22) Filed: Apr. 21, 2020

(65) Prior Publication Data

US 2020/0247935 A1 Aug. 6, 2020

Related U.S. Application Data

(63) Continuation-in-part of application No. 16/821,357, filed on Mar. 17, 2020, which is a continuation of application No. 16/532,800, filed on Aug. 6, 2019, now Pat. No. 10,626,211.

(60) Provisional application No. 62/714,817, filed on Aug. 6, 2018.

(51) Int. Cl.
| | |
|---|---|
| C08F 297/00 | (2006.01) |
| C08F 212/08 | (2006.01) |
| C08F 210/10 | (2006.01) |
| C08L 25/16 | (2006.01) |
| C08L 23/22 | (2006.01) |

(52) U.S. Cl.
CPC .......... C08F 297/00 (2013.01); C08F 210/10 (2013.01); C08F 212/08 (2013.01); C08L 23/22 (2013.01); C08L 25/16 (2013.01); C08F 2800/20 (2013.01); C08L 2207/04 (2013.01)

(58) Field of Classification Search
CPC ....... C08F 293/00; C08F 297/00; C08L 53/00
See application file for complete search history.

(56) References Cited

U.S. PATENT DOCUMENTS

| | | | |
|---|---|---|---|
| 5,733,998 A | 3/1998 | Kennedy et al. | |
| 6,214,937 B1 | 4/2001 | Kennedy et al. | |
| 8,889,926 B2 | 11/2014 | Kennedy et al. | |
| 10,626,207 B1* | 4/2020 | Kennedy | C08F 257/02 |
| 10,626,211 B2* | 4/2020 | Kennedy | C08F 8/02 |

OTHER PUBLICATIONS

Nugay, et al.; Low cost bifunctional initiators for bidirectional living cationic polymerization of olefins. II Hyperbranched Styrene-isobutylene-styrene triblocks with superior combination of properties; Journal of Polymer Science; www.polymerchemistry.org. 9 pages, (2017).

P.G. Santangelo, et al.; Molecular weight dependence of fragility in polystyrene; Macromolecules 1998, 31, 4581-4585; 5 Pages.

* cited by examiner

*Primary Examiner* — Jeffrey C Mullis

(74) *Attorney, Agent, or Firm* — Renner Kenner Greive Bobak Taylor & Weber

(57) ABSTRACT

A star block copolymer and a thermoplastic elastomer including plurality of the star block copolymers and a method of making both is taught. The star block copolymers of the present invention include a core component having either a styrene oligomer or α-methyl styrene oligomer, wherein arms emanate from the core component and the arms are poly(isobutylene-block-styrene) diblock copolymers.

3 Claims, 3 Drawing Sheets

SYNTHESIS OF STAR ISOBUTYLENE-BASED THERMOPLASTIC ELASTOMERS

CROSS-REFERENCE TO RELATED APPLICATIONS

This application is a continuation-in-part of U.S. patent application Ser. No. 16/821,357 entitled "Star Isobutylene-Based Thermoplastic Elastomers," filed Mar. 17, 2020, which is a continuation of U.S. patent application Ser. No. 16/532,800 having the same title, filed Aug. 6, 2019, which claims the benefit of U.S. Provisional Application Ser. No. 62/714,817 entitled "Novel Star Isobutylene-Based Thermoplastic Elastomers" filed Aug. 6, 2018, all of which are incorporated herein by reference in their entireties.

FIELD OF THE INVENTION

The present invention relates to the synthesis of a star block copolymer and to synthesis of a star block copolymer-based thermoplastic elastomer. Most particularly, the present invention relates to synthesis of a star block copolymer-based thermoplastic elastomer exhibiting advantageous mechanical properties such as high strength and essentially no creep. Furthermore, the star block copolymer-based thermoplastic elastomer also exhibits advantageous biocompatibility and biostability, advantageous oxidative-hydrolytic resistance, advantageous barrier properties, advantageous calcification resistance properties, and advantageous damping properties. Specifically, the present invention relates to the structure and synthesis of a star block copolymer consisting of a styrene oligomeric core or an α-methyl styrene (αMeSt) oligomeric core from which poly(isobutylene-block-styrene) diblock arms emanate, and the structure and synthesis of a star block copolymer-based thermoplastic elastomer comprising a plurality of the aforementioned star block copolymers.

BACKGROUND OF THE INVENTION

Poly(styrene-b-isobutylene-b-styrene) (SIBS) is a thermoplastic elastomer that has gained attention recently due to its high degree of biocompatibility. Due to its biocompatibility, SIBS has been found to be useful for a variety of applications, such as stent coating, glaucoma shunt, and tubing. This linear block copolymer has a triblock structure formed by a polyisobutylene (PIB) core sandwiched between blocks of polystyrene (PS). The formulation of SIBS can be tailored for different applications by changing the weight percentage of PS or by changing the molecular weight of the polymer chains. The hard PS blocks provide SIBS with a glassy microstructure that enhances mechanical strength and rigidity of the material, while the PIB has a soft microstructure with increased chain mobility that gives the polymer its elastomeric properties. The possibility of tailoring mechanical properties, together with the high degree of biocompatibility, makes SIBS an ideal material for use in biomedical devices.

However, there is a high cost associated with making SIBS. The high cost (30-40%) of most SIBS products is largely due to the expensive bifunctional polymerization initiator needed for synthesis. Typically, that expensive bifunctional polymerization initiator is 1-(tert-butyl)-3,5-bis(2-chloropropan-2-yl)benzene (abbreviated herein as HDCCl, for hindered dicumyl chloride):

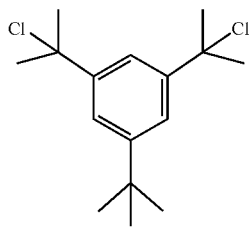

5-tert-butyl-1,3-bis(1-chloro-1-methylethyl)benzene (HDCCl)

(I)

Other initiators commonly used for the synthesis of well-defined telechelic PIBs (synthesize by living cationic polymerization (LC$^+$P) of isobutylene) include those described in U.S. Pat. No. 5,733,998 to Kennedy et al. and U.S. Pat. No. 8,889,926 to Kennedy et al., the disclosure of which are incorporated herein by reference in their entirety.

Block copolymers of similar compositions often have diverse mechanical properties due to their composite nature. Parameters such as molecular weight, block weight percentage, and polymer chain structure are known to give rise to different microstructures that, in turn, lead to different material properties. Different grades of SIBS can have very different morphologies based on the ratio of hard phase to soft phase. At lower contents of PS, the hard phase forms spherical domains through the soft matrix. As the PS content increases, the spherical domains become double gyroid structures, and as the PS content is further increased, the structure of the hard phase becomes lamellar. It is likely that the incompatibility of the soft and hard phases leads to micro-phase separations and results in the different morphologies described. It is well known that for composite systems, the interface between different phases plays a major role in the performance of the material. A weakened interface might lead to premature cracking and failure. Additionally, the method of fabrication for SIBS might play a very important role due to the incompatibility of the different phases. Therefore, different methods may result in different qualities of the interface.

A less expensive industrial version of a PIS-based linear thermoplastic elastomer is SIBSTAR™, commercially available from Kaneka Co. However, this product is known to be contaminated with byproducts and has worse mechanical properties than well-defined SIBS, which therefore severely limits its use.

However, for all of its attributes, SIBS has been found to be of modest strength and tends to exhibit higher creep than desired for many applications, including medical devices. Therefore, the need exists for a new PIS-based star-shaped thermoplastic elastomer, useful for implantable medical devices and industrial applications, that have the key advantageous properties of SIBS, such as biocompatibility, biostability, elasticity, and processability, but that also exhibits higher strength and toughness as compared to SIBS, and diminished to essentially no creep, which SIBS does not exhibit. Furthermore, this new material should be able to be synthesized without the use of a costly multi-functional initiator.

SUMMARY OF THE INVENTION

Generally, the present invention provides for the synthesis of a star block copolymer comprising a core component having either a styrene oligomer or an α-methyl styrene oligomer, and arms emanating from the core component wherein the arms are polyisobutylene polymers, or more preferably, poly(isobutylene-block-styrene) diblock copolymers. Furthermore, the present invention provides for the formation of a thermoplastic elastomer through the physical crosslinking of a plurality of the star block copolymers.

Advantageously, if the star block copolymers produced by the present invention have a consistent oligomeric core that consistently provides a like number of star polymer arms, it will be appreciated that the star block copolymers of the present invention have a tensile strength of greater than 20 MPa, preferably greater than 24 MPa, and more preferably, greater than 28 MPa, and have essentially no creep deformation while being cheaper and easier to process than other block copolymers, such as SIBS. By "essentially no creep" or "essentially no creep deformation," it is meant that any creep of the copolymers and thermoplastic elastomers of the present invention is de minimus and does not in any way affect the essential nature of the composition. Essentially no creep deformation could also result regardless of the consistency of the oligomeric core or consistency of the number of polymer arms.

In one or more embodiments, the arms of the star block copolymers of the present invention include a polyisobutylene block having a number average molecular weight of between about 30,000 and about 40,000 g/mol and a polystyrene block having a number average molecular weight of between about 12,000 and about 14,000 g/mol.

In one or more embodiments of the present invention, the star block copolymer comprises a core component having a styrene oligomer or a αMeSt oligomer and arms emanating from the core component, wherein the arms are poly(isobutylene-block-styrene) diblock copolymers. In at least one embodiment, the start block copolymer is produced by cationically synthesizing a styrene oligomer or an αMeSt oligomer; acetylating the styrene oligomer to form a styrene oligomer with acetyl groups; converting the acetyl groups to cumyl hydroxide groups; undertaking living carbocationic polymerization of isobutylene to form polyisobutylene blocks; and undertaking living carbocationic polymerization of styrene to form polystyrene blocks at an end of each polyisobutylene block to provide the poly(isobutylene-block-styrene) diblock copolymer arms.

In a further embodiment, the present invention provides a method of synthesizing a thermoplastic elastomer containing a plurality of star block copolymers comprising a core component, having either a styrene oligomer or an α-methyl styrene oligomer, and arms emanating from the core component, wherein the arms are poly(isobutylene-block-styrene) diblock copolymers. The method includes the formation of a plurality of the star block copolymers as discussed above, and then physically crosslinking through aggregation of the polystyrene portion of the arms of the plurality of star block copolymers so as to form the thermoplastic elastomer.

Advantageously, the present invention provides a star block copolymer-based thermoplastic elastomer exhibiting advantageous mechanical properties such as high strength and essentially no creep, advantageous biocompatibility and biostability, advantageous oxidative-hydrolytic resistance, advantageous barrier properties, advantageous calcification resistance properties, and advantageous damping properties.

BRIEF DESCRIPTION OF THE DRAWINGS

For a more complete understanding of the features and advantages of the present invention, reference is now made to the detailed description of the invention along with the accompanying figures in which.

DETAILED DESCRIPTION OF ILLUSTRATIVE EMBODIMENTS

Figure 1:
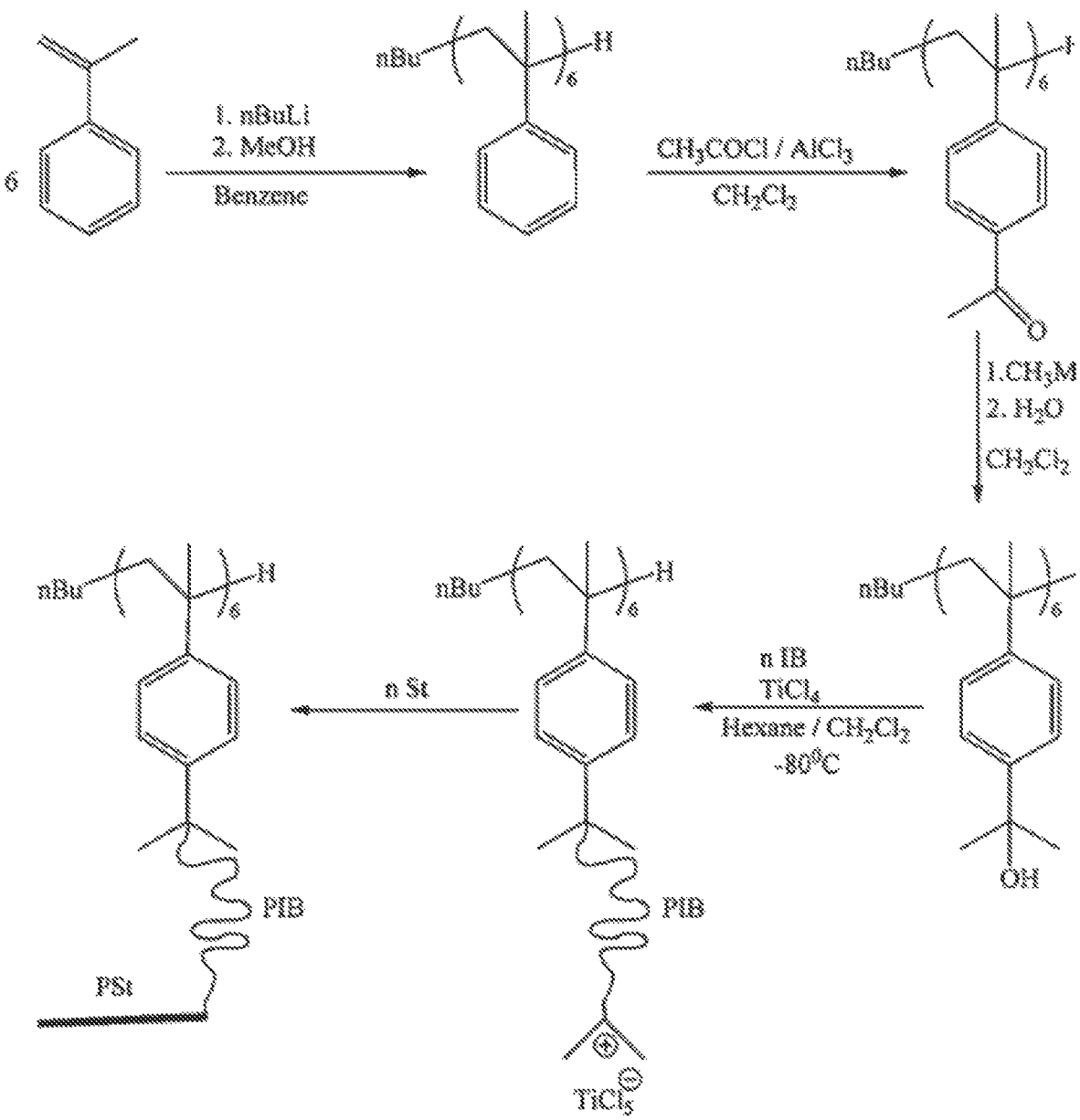
FIG. 1 is a synthetic strategy for the preparation of the star block copolymer of the present invention.

The present invention generally relates to a thermoplastic elastomer having improved mechanical properties over ordinary thermoplastic elastomers. It will be appreciated that the generally recognized understanding of the term "thermoplastic elastomer" refers to the class of copolymers which consist of materials with both thermoplastic and elastomeric properties. Thermoplastic elastomers show advantages typical of both rubbery materials and plastic materials.

As use herein, the term "thermoplastic elastomer" will also be defined as meaning a plurality of star block copolymers physically crosslinked with one another and wherein the star block copolymers comprise a core component of either a styrene oligomer or an α-methyl styrene (herein also denoted as αMeSt) oligomer and arms emanating from the core component wherein the arms are polyisobutyene or poly(isobutylene-block-styrene) diblock copolymers.

Generally, the thermoplastic elastomers of the present invention include a plurality of star block copolymers each consisting of a core component having either a styrene oligomer or an α-methyl styrene oligomer, abbreviated hereinafter, collectively, as OαMeSt (for ease of discussion, when OαMeSt is used, the O stands for oligomeric and it will be understood that the αMeSt, when used as OαMeSt, can also just be styrene), and arms emanating from the core component, wherein the arms are poly(isobutylene-block-styrene) diblock copolymers, abbreviated hereinafter as P(IB-b-St). Throughout the course of this disclosure, the star block copolymer of the present invention, consisting of a core component having either a styrene oligomer or an αMeSt oligomer, and arms emanating from the core component wherein the arms are poly(isobutylene-block-styrene) diblock copolymers, will be abbreviated as OαMeSt-g-P(IB-b-St).

In one or more embodiments, the OαMeSt-g-P(IB-b-St) of the present invention is represented by the following formula:

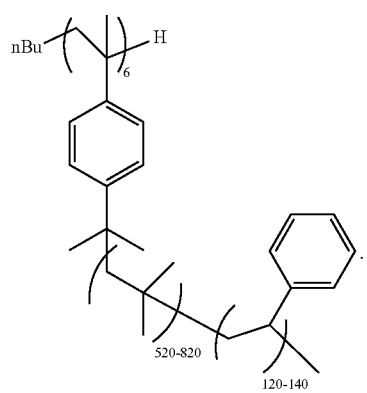

It is understood by those skilled in the art that the range 520-820 is an approximation of the number of isobutylene units in the arm and that the range 120-140 is an approximation of the number of styrene units in the arm. These ranges of units amount to a number average molecular weight of each polyisobutylene block of each poly(isobutylene-block-styrene) diblock copolymer arm of between about 30,000 and about 40,000 g/mol and wherein the number average molecular weight of each polystyrene block of each poly(isobutylene-block-styrene) diblock copolymer arm of between about 12,000 and about 14,000 g/mol. Due to the large size of each diblock arm, the contribution of the core component, OαMeSt, to the overall weight of the OαMeSt-g-P(IB-b-St) is insignificant at about 0.02% of the overall weight.

The structural details of the OαMeSt-g-P(IB-b-St), i.e., the length and molecular weight distribution of the core component, OαMeSt, and the diblock arms, P(IB-b-St), the relative volume amounts of the rubbery polyisobutylene block and glassy polystyrene block, and the overall two phase morphology must be precisely controlled so as to obtain superior properties once combined to form a thermoplastic elastomer and to have the OαMeSt-g-P(IB-b-St) be easy to process.

In one embodiment of the present invention, the OαMeSt core may be a hexamer. Preferably, every unit of styrene or MeSt carries one poly(isobutylene-block-styrene) diblock arm in the star block copolymer, OαMeSt-g-P(IB-b-St). As stated above, the average molecular weight of each polyisobutylene block of each poly(isobutylene-block-styrene) diblock copolymer arm is between about 30,000 and about 40,000 g/mol and wherein the number average molecular weight of each polystyrene block of each poly(isobutylene-block-styrene) diblock copolymer arm is between about 12,000 and about 14,000 g/mol. The molecular weights are dictated by the targeted spherical morphology of a thermoplastic elastomer made from a plurality of the OαMeSt-g-P(IB-b-St) star block copolymers, which arises when the hard (PSt)/soft (PIS) segment weight ratio is about 30/70. The molecular weight dispersity of the PIS and PSt segments is narrow, substantially less than about 2.0, which arises because each block of the diblock arm is produced by a living carbocationic polymerization technique. Where the OαMeSt core is produced cationically, it will be appreciated that the consistency of the number of units of styrene or αMeSt is not controllable, and therefore, the number of arms that emanate from the core will vary between 2 and 10 units.

The core component, OαMeSt, provides a rigid center for the star block copolymer. As stated above, the preferred degree of polymerization (DP) of the core component is 6, its DP can also be 2, 3, 4, 5, 7, 8, 9, 10 or higher. Importantly, the OαMeSt core component can be easily acetylated, and the para acetyl ($CH_3CO$—) groups can then be easily converted to p-$(CH_3)_2OH$ groups, which are needed to initiate the living carbocationic polymerization of isobutylene followed by the living carbocationic polymerization of styrene in producing the star block copolymer.

The long rubbery polyisobutylene (PIS) block of each diblock arm provides the continuous phase which provides for high elongation and strength, outstanding barrier and damping properties, oxidative and hydrolytic resistance, calcification resistance, biocompatibility and biostability. The average number molecular weight of the glassy polystyrene (PSt) block of each diblock arm ensures good phase separation between the glassy polystyrene block and the rubbery polyisobutylene block and also yields the highest glass transition temperature (the glass transition temperature of polystyrene increases with increased molecular weight and reaches about 93° C. at about 10,000 g/mol). The polystyrene (PSt) block also provides the ability to physically crosslink with other polystyrene blocks of other OαMeSt-g-P(IB-b-St) star block copolymers when combined to form a thermoplastic elastomer.

The OαMeSt-g-P(IB-b-St) star block copolymers of the present invention have a tensile strength of greater than 20 MPa and have essentially no creep deformation. These numbers are a large increase when compared to SIBS which exhibits modest tensile strength numbers of less than 20 MPa and poor creep resistance. On account of its star shape, the OαMeSt-g-P(IB-b-St) star block copolymers of the present invention is of relatively lower viscosity than SIBS and can therefore be easier melt processed. Furthermore, the radius of gyration of the OαMeSt-g-P(IB-b-St) star block copolymers of the present invention is lower than that of SIBS, which results in lower viscosity and consequently easier processing. Additionally, the OαMeSt-g-P(IB-b-St) star block copolymers of the present invention are soluble in organic solvents, so they can also be solution processed. Thus, the OαMeSt-g-P(IB-b-St) star block copolymers of the present invention can be used in the medical field as well as in a multitude of different industrial and consumer applications such as hot melt and pressure sensitive adhesives, overmolds, electrical insulators, automotive uses, sealants, caulks, damping devices, and tubing. This may or may not be the case where the core component is synthesized cationically.

The first step in producing the star block copolymer comprising a core component having a styrene oligomer or an αMeSt oligomer and arms emanating from the core component wherein the arms are poly(isobutylene-block-styrene) diblock copolymers is to synthesize the core component.

Figure 2:
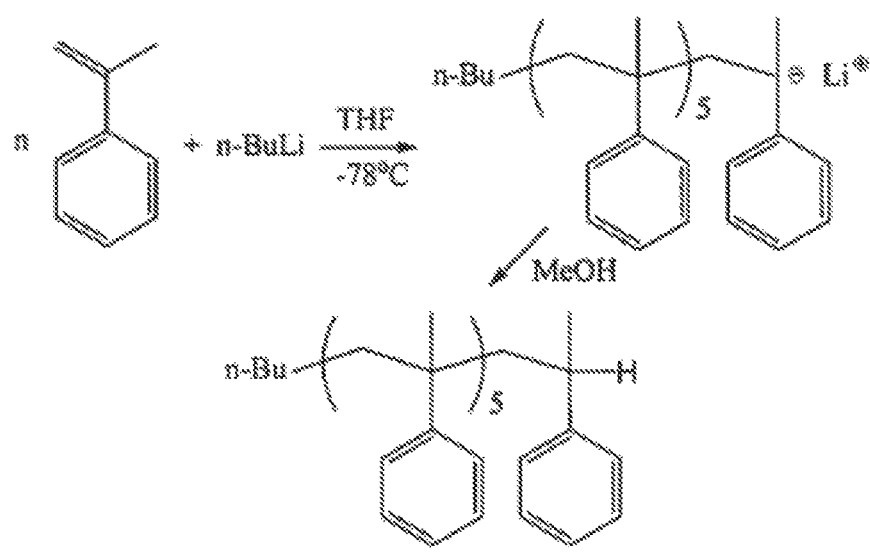
FIG. 2 is a synthetic strategy for the preparation of the core component of the star block copolymer of the present invention.

FIG. 2 shows one (anionic) synthetic path for synthesizing the styrene oligomer or, more particularly, the α-methyl styrene oligomer. Oligomerization is carried out under high vacuum conditions. The styrene or α-methyl styrene monomer is freshly distilled over calcium hydride or other desiccant under reduced pressure and it is then distilled over dibutylmagnesium or similar reagent under high vacuum conditions. Next, oligomerization is initiated when n-BuLi is added to the monomer in a solution of THF under strong stirring at a temperature of between −80 and −75° C.

Oligomerization is conducted for a period of between about 4 and 6 hours and it may be terminated by the addition of any known termination agent, including methanol. The product formed is then precipitated into excess methanol, filtered and dried under reduced pressure.

Alternatively, synthesis of the styrene oligomer or the αMeSt oligomer, can be made cationically, instead of the above-disclosed anionic method wherein sec.-BuLi is used. Rather, in the cationic synthesis, a small amount of a co-initiator, such as $TiCl_4$ or other strong Friedel Crafts acid, e.g., $AlCl_3$, $AlBr_3$, $BF_3$, and $SnCl_4$, can be added to styrene or αMeSt monomer in bulk or in solution to make the oligomeric αMeSt or styrene initiator. Many known hydrocarbon-based solutions can be used, such as an aliphatic hydrocarbon solution, a methylene chloride solution, a methyl chloride solution, an n-butyl chloride solution, a dichloromethane solution, or a carbon disulfide solution. It will be understood that the structure of the final star polymer will be less precisely defined in that the number of units of oligomer would not consistently be 6 (hexamer) but rather would be 2 to 10. But for industrial use, this star would be useful.

Generally, in order to cationically synthesize the styrene or α-methyl styrene oligomers, one would place approximately 10 mL of α-MeSt or styrene in a large test tube at room temperature in bulk. A few drops of $TiCl_4$ would then be added to this monomer while shaking the large test tube to mix the system. Alternatively, If the heat of polymerization is excessive, the test tube can be cooled by immersing it in ice water. After about 10 minutes, the contents of the test tube would be poured into 100 mL of methanol. The white precipitate that is formed is then filtered off and washed with another aliquot of 10 to 20 mL of methanol. It will be appreciated that oligomers of styrene or α-methyl styrene having 2 to 10 units are randomly produced via this cationic method.

Once the styrene oligomer or α-MeSt oligomer is formed, it is then acetylated. To begin acetylation of the oligomer, anhydrous $AlCl_3$ and $CH_2Cl_2$ are added together, and this mixture is then cooled to about 0° C. $CH_3COCl$ is subsequently added dropwise over a 10-minute period. Next, the styrene oligomer or α-methyl styrene oligomer is added to the reaction mixture, and the reaction is allowed to proceed at room temperature.

After acetylation of the styrene oligomer or α-methyl styrene oligomer, the acetyl groups are converted to cumyl hydroxide groups. In this process, anhydrous diethyl ether is added to a solution of methyl magnesium bromide in a reacting flask. Concurrently, the styrene oligomer or α-methyl styrene oligomer with acetyl groups is dissolved in anhydrous diethyl ether. This solution is then added to the reacting flask and the reaction is allowed to proceed. After the reaction proceeds, concentrated $H_2SO_4$ is poured onto ice and then the icy solution is diluted with distilled water and subsequently added to the reacting flask.

Upon formation of the styrene oligomer or α-methyl styrene oligomer with cumyl hydroxide groups, living carbocationic polymerization of isobutylene is undertaken to form the polyisobutylene blocks. To conduct living carbocationic polymerization, the core component, i.e., the OαMeSt product with cumyl hydroxide groups prepared above, is added to a round bottom flask equipped with a magnetic stirrer, and the flask is then evacuated for 30 minutes. Hexane and $CH_2Cl_2$ are transferred into the flask, and tetramethylethylenediamine (TMEDA) is added. The system is then cooled to a temperature of between about −85 and about −75° C., and isobutylene is added. The solution is strongly stirred. Living carbocationic polymerization of isobutylene is initiated by the addition of a coinitiator such as $TiCl_4$. The reaction is allowed to continue for approximately 2 hours.

Upon depletion of the isobutylene monomer, the monomer is switched to styrene. Living carbocationic polymerization of styrene is then undertaken to form polystyrene blocks at an end of each polyisobutylene block, thereby providing the poly(isobutylene-block-styrene) diblock copolymer arms. To conduct the living carbocationic polymerization of styrene, 2,5-di-tert-butyl pyridine (DtBP) and styrene are added at about −80° C. to the living intermediate formed above. The living carbocationic polymerization of styrene is allowed to proceed for two hours and is then terminated by the addition of methanol or other known terminating agent. The OαMeSt-g-P(IB-b-St) star block copolymer formed is insoluble in water and alcohols while being soluble in toluene, THF, and methylcyclohexane. It is colorless strong rubber with good elongation and practically no creep deformation.

In a further embodiment, the present invention provides a method of synthesizing a thermoplastic elastomer containing a plurality of star block copolymers comprising a core component comprising a styrene oligomer or α-methyl styrene oligomer (OαMeSt) and arms emanating from the core component wherein the arms are poly(isobutylene-block-styrene) diblock copolymers. The method includes the formation of a plurality of the star block copolymers as discussed above, and then the physical crosslinking through aggregation of the plurality of star block copolymers so as to form the thermoplastic elastomer.

Figure 3:
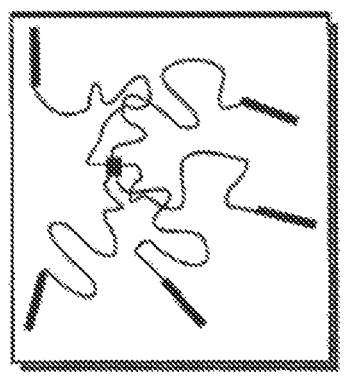
FIG. 3 is a representative microarchitecture of a representative star block copolymer of the present invention.
Figure 4:
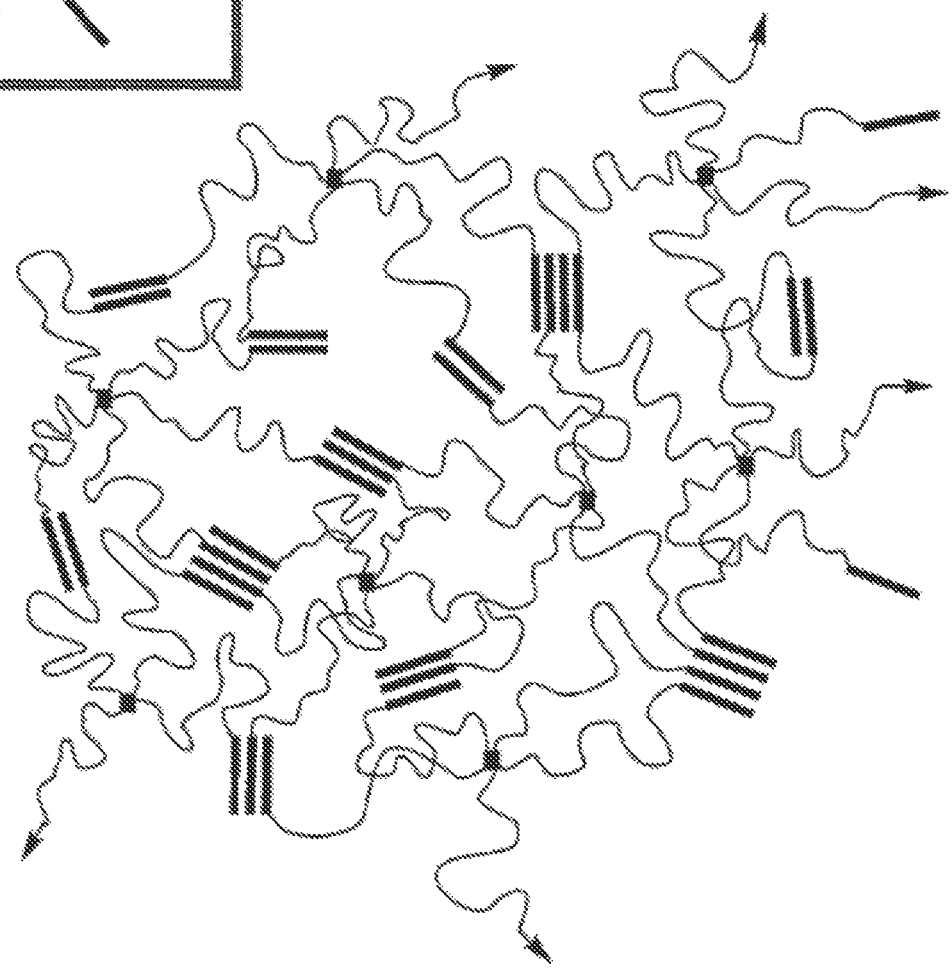
FIG. 4 is a representative microarchitecture of a representative thermoplastic elastomer of the present invention.

FIG. 3 is a representative microarchitecture of a single star block copolymer of the present invention and FIG. 4 is a representative microarchitecture of a representative thermoplastic elastomer of the present invention. Thermoplastic elastomer 10 comprises a plurality of OαMeSt-g-P(IB-b-St) star block copolymers 12 wherein the core components are represented by the number 14, the polyisobutylene blocks re represented by the number 16, and the polystyrene blocks are represented by the number 18. As can be clearly shown in FIG. 4, at least some of the polystyrene blocks 18 of the plurality of star block copolymers 12 are physically crosslinked through aggregation. The microarchitecture of the thermoplastic elastomer 10 leads to multiple entanglements and better stress distribution, which results in superior strength and the virtual absence of creep.

In a further embodiment, the present invention provides a method of synthesizing a thermoplastic elastomer containing a blend of OαMeSt-g-P(IB-b-St) star block copolymers and SIBS copolymers. These two copolymers can be easily blended together because they both contain polyisobutylene and polystyrene blocks. Thus, various proportions of SIBS copolymers and OαMeSt-g-P(IB-b-St) star block copolymers of the present invention can be blended and the blends can be used to fine tune the mechanical properties and processibility of the thermoplastic elastomer formed. These blends are homogeneous as the chemical nature of the polyisobutylene blocks of the SIBS copolymers and OαMeSt star block copolymers are identical.

In various embodiments, SIBS is blended with different amounts, from between about 10 and about 30 wt. % of the OαMeSt-g-P(IB-b-St) star block copolymers. Utilizing a solution blending technique, the two copolymers are dissolved in a common solvent, such as THF, then, the system is stirred for about 30 minutes, and then the blend is recovered by precipitation into methanol and dried to a constant mass in vacuum. Alternatively, the two copolymers are melt blended in an internal mixer at a temperature of between about 165 and about 175° C. using shear rates of between about 10 and about 100 rpm. To mechanically test the blends, they are compression molded into about 0.6 mm thick films in a stainless steel mold at a temperature of between about 165 and 175° C. for 15 minutes.

In a further embodiment, the present invention provides a method of synthesizing a thermoplastic elastomer containing a blend of OαMeSt-g-P(IB-b-St) star block copolymers and commercially available linear poly(styrene-b-ethylene-b-butylene-styrene) (SEBS, sold under the trade name Kraton™ G by Kraton Co). SEBS and the OαMeSt-g-P(IB-b-St) star block copolymers of the present invention can be blended in order to increase the oxidation resistance and processibility of SEBS. As Kraton™ G contains between 20 and 30% by mass of polystyrene, they blend well with the OαMeSt-g-P(IB-b-St) star block copolymers because it also contains polystyrene blocks.

To achieve desirable effects, Kraton™ G is blended with between about 10 to about 30 wt. % of OαMeSt star block copolymers. Blending can be effected by solution or melt blending. Thus, Kraton™ G and various amounts of OαMeSt-g-P(IB-b-St) star block copolymers are dissolved in a common solvent, such as THF, then, the system is stirred for about 30 minutes, and then the blend is recovered by precipitation into methanol. The recovered blend is dried to a constant mass in a vacuum. Alternatively, the two copolymers are melt blended in an internal mixer operating at a temperature of between about 165 and 175° C. under shear rates between about 10 and about 100 rpm. To mechanically test the blends, they are compression molded into about 0.6 mm thick films in a stainless steel mold at a temperature of between about 165 and 175° C. for 15 minutes.

In another embodiment of the present invention, it has been discovered that if living carbocationic polymerization of styrene as discussed above is allowed to proceed for more than 2 hours, preferentially for between about 3 and about 6 hours, a hyperbranched OαMeSt-g-P(IB-b-St) star block copolymer is formed. In one embodiment, the DtBP and styrene are added to the living intermediate formed in step four above and then the living carbocationic polymerization of styrene is allowed to proceed for a time of between about 3 and about 6 hours. Subsequently, the polymerization is terminated with methanol, the system is warmed to room temperature, concentrated by rotary evaporation, and precipitated into methanol. The methanol is then decanted, the product is dissolved in hexane, and then washed with aqueous sodium bicarbonate and water. The organic phase is dried over magnesium sulfate overnight, the solids are separated by filtering through fine sintered glass, and the solvent is evaporated by rotary evaporation. The product formed is called hyperbranched OαMeSt-g-P(IB-b-St) star block copolymer. Thus, increasing the time allowed for the living carbocationic polymerization of styrene produces a hyperbranched OαMeSt-g-P(IB-b-St) star block copolymer having increased strength and modulus.

EXAMPLES

In order to demonstrate practice of the invention, the following examples are offered to more fully illustrate the invention, but are not to be construed as limiting the scope thereof. Further, while some of examples may include conclusions about the way the invention may function, the inventors do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is number average molecular weight, temperature is in degrees Centigrade, and pressure is at or near atmospheric.

The first experiment concerns the preparation of an oligomeric styrene (OαMeSt) hexamer utilizing an anionic technique. FIG. 2 outlines the procedure. Oligomerization of MeSt is carried out under high vacuum conditions on a conventional Schlenk line. The monomer is freshly distilled over calcium hydride under reduced pressure and then distilled over dibutylmagnesium under high vacuum conditions. Then, n-BuLi (12 mL, $2.6 \times 10^{-2}$ mol) is added to 20.26 mL, $1.56 \times 10^{-1}$ mol) MeSt in 300 mL THF under strong stirring at −78° C. Oligomerization is conducted for 5 hours and terminated by the addition of methanol. The product is precipitated into excess methanol, filtered, and dried under reduced pressure. The yield is essentially quantitative. The structure, molecular weight and molecular weight distribution is analyzed by $^1$H NMR spectroscopy and GPC, respectively.

In a second experiment concerns the acetylation of the OαMeSt. Anhydrous $AlCl_3$ (2.412 g, 18 mmol) is placed into a 250 mL flask equipped with a stir bar and a 50 mL addition funnel, the flask is evacuated, and then charged with nitrogen. Then, 30 mL $CH_2Cl_2$ is transferred to the flask via a capillary by nitrogen pressure. The mixture is then cooled to 0° C. and $CH_3COCl$ (1.413 g, 18 mmol dissolved in 10 mL $CH_2Cl_2$ in the addition funnel) is added dropwise over a 10 minute period. In order to achieve exhaustive acetylation, a 3-fold stoichiometric excess of $AlCl_3$ and $CH_3COCl$ are used. Then, from the first experiment, $0(\alpha MeSt)_6$ (4.596 g, 6 mmol) dissolved in 100 mL $CH_2Cl_2$ is added to the reaction mixture and the reaction is allowed to proceed for 15 minutes at room temperature. The product is poured into a beaker containing about 10 g of ice and 4 mL of concentrated HCl. The organic layer is washed successively with water and bicarbonate solution, separated and dried over anhydrous $MgSO_4$ overnight. The solution is concentrated and precipitated into excess methanol. The yield is essentially quantitative. The extent of the acetylation is monitored by NMR spectroscopy.

In a third experiment, a three-necked 250 mL round-bottom flask equipped with a stir bar, a dripping funnel fitted with a drying tube, and a reflux condenser fitted with a drying tube are all through flame dried and charged with nitrogen. To the flask, 20 mL of anhydrous diethyl ether is added via a syringe, followed by 2.025 mL (6 mmol) of a solution of 3M methyl magnesium bromide in anhydrous diethyl ether. Concurrently, from the second experiment, 1.018 g (1 mmol) of the OαMeSt-$OA_{C6}$ is dissolved in 20 mL of anhydrous diethyl ether in a beaker, and the resulting solution is transferred to the dropping funnel. The solution is added dropwise to the reactor flask. After the reaction proceeds, 0.80 mL (15.57 mmol) of concentrated $H_2SO_4$ is poured onto ice in a 50 mL beaker. The icy acid is then diluted with distilled water in a 250 mL beaker, the drying tube is removed from the condenser, and the acid solution is added dropwise to the stirring reactor flask. Once all the magnesium in the flask has reacted, the contents are poured into a separating funnel. The organic layer is separated and the aqueous layer is extracted twice with two 15 mL portions of diethyl ether. The combined organic layer is dried over $MgSO_4$ and the solids are filtered off of the ethereal solution. To purify the product from the third experiment, the ethereal solution is evaporated to dryness, the flask is then cooled to room temperature and placed in an ice bath. The crude, solid product is then recrystallized from methanol. The structure and the molecular weight of the purified product are determined by NMR spectroscopy and GPC, respectively.

In a fourth experiment, the living polymerization of isobutylene was carried out as follows. Into a flame dried 1 L round bottom flask equipped with a magnetic stirrer is placed $9.1 \times 10^{-2}$ g ($6.7 \times 10^{-5}$ mol) cumyl hydroxyl functionalized MeSt hexamer initiator, as prepared in the third experiment, and the flask is evacuated for 30 minutes. Then, 198 mL dry hexane and 132 mL dry $CH_2Cl_2$ are transferred into the flask by a cannula. Then, 01.18 mL ($1.20 \times 10^{-3}$ mol) TMEDA is added, the system is then cooled to −80° C., and then isobutylene (18.42 mL, 0.25 mol) is added. The solution is strongly stirred and the living polymerization of isobutylene is initiated by the addition of $TiCl_4$ (1.05 mL, $9.6 \times 10^{-3}$ mol). The reaction is allowed to proceed for 120 minutes. Following this time period, a sample is withdrawn to be characterized by $^1$H NMR spectroscopy and GPC.

In a fifth experiment, the active living intermediate at −80° C., as obtained in the fourth experiment, DTP (0.26 mL, 1.2×10$^{-3}$ mol) and styrene (6.6 mL, 5.8×10$^{-2}$ mol) are added. The polymerization of styrene is allowed to proceed for two hours and is then terminated with the addition of 10 mL of methanol. The system is warmed to room temperature and then the solution is concentrated by rotary evaporation and precipitated into 1 L of methanol. The methanol is then decanted, the polymer is then dissolved in hexane, and then washed with 5% aqueous sodium bicarbonate and water. The organic phase is dried overnight over magnesium sulfate, the solids are then removed by filtration through fine sintered glass, and the solvent is then evaporated by rotary evaporation. The product, OαMeSt-g-P(IB-b-St), is dried in a vacuum oven at 50° C. for a two day period. Structural and molecular characterization is conducted by $^1$H NMR spectroscopy and GPC.

The product, OαMeSt-g-P(IB-b-St), is found to be insoluble in water and alcohols, whereas is found to be soluble in toluene, THF and methylcyclohexane. OαMeSt-g-P(IB-b-St), is a colorless strong rubber with good elongation and shows practically or essentially no creep. OαMeSt-g-P(IB-b-St), can be cast, calendared, molded, and extruded. The tensile strength of OαMeSt-g-P(IB-b-St) is in excess of 20 MPa, and it shows essentially no creep deformation. OαMeSt-g-P(IB-b-St) can be used in a great variety of industrial TPE applications, whereas linear SIBS cannot be used, for example, in automotive and diverse consumer application. Its varied use can be attributed to its biocompatibility and biostability, which also makes OαMeSt-g-P(IB-b-St) useful in implantable medical devices.

A sixth experiment may be undertaken based on the fact that the PIB and PSt segments in both linear SIBS and OαMeSt-g-P(IB-b-St) are essentially identical. Because of the similar nature of these segments, these segmented polymers can be combined to form homogenous blends. Thus, various proportions of linear SIBS and OαMeSt-g-P(IB-b-St) can be blended and the blends can then be used to fine tune the mechanical properties and processibility of these blended TPEs. Further, the high cost of forming linear SIBS can be reduced by blending it with lower cost OαMeSt-g-P(IB-b-St). Importantly, the blends are homogeneous as the chemical nature of the PIB segments in both OαMeSt-g-P(IB-b-St) and linear SIBS are identical.

Linear SIBS may be blended with different amounts, i.e., 10-30% (by weight) of OαMeSt-g-P(IB-b-St). By utilizing a solution blending technique, the two polymers may be dissolved in a common solvent, e.g., THF, and then the system can be stirred for about 30 minutes so as to ensure blending at the molecular level. The blend may then be recovered by precipitation into methanol and dried to a constant mass in a vacuum. Alternatively, the two segmented polymers can be melt blended in an internal mixer at a temperature of between about 165 and about 175° C. using shear rates between about 10 and about 100 rpm. For mechanical testing, blends can be then compression molded into about 0.6 mm thick films in a stainless steel mold at a temperature of between about 165 and about 175° C. for 15 minutes.

A seventh experiment may be undertaken in order to increase the oxidation resistance and processibility of commercially available linear poly(styrene-b-ethylene-b-butylene-styrene) (SEBS, sold under the tradename Kraton™ G by Kraton Co.) Therefore, Kraton™ G (or other versions of Kraton™) may be blended with OαMeSt-g-P(IB-b-St). As any version of Kraton™ contains 20-30% by mass or PSt, it can be blended with OαMeSt-g-P(IB-b-St). To achieve desirable effects, any version of Kraton™ may be blended with 10 to 30% (by weight) OαMeSt-g-P(IB-b-St). Blending can be effected by solution or melt blending. Thus, any version of Kraton™ and various amount of OαMeSt-g-P(IB-b-St) may be dissolved in THF, that serves to dissolve both constituents, the mixture can be stirred for 30 minutes to ensure blending at the molecular level, and then recovered by precipitation into methanol. The recovered blend can be dried to a constant mass in vacuum. Alternatively, the two polymers can be melt blended in an internal mixer operating at a temperature of between about 165 and about 175° C. under shear rates between about 10 and about 100 rpm. For mechanical testing, blends may be compression molded into about 0.6 mm thick films in a stainless steel mold at a temperature of between about 165 and about 175° C. for 15 minutes.

An eighth experiment may be undertaken in order to examine what occurs when the time of the living styrene polymerization is extended beyond complete monomer consumption. Recent research has shown that the mechanical properties of SIBS increases, without compromising processing properties, when the time of the living styrene polymerization is extended beyond complete monomer consumption. This effect was shown to be due to the formation of hyperbranched SIBS by alkylation of PSt phenyl groups by live benzyl cations. This effect can also be used to increase the strength of PSt-g-P(IB-b-St).

Thus to living PIB cations, the preparation of which is detailed above in the fourth experiment, DtBP (0.26 mL, 1.2×10$^{-3}$ mol) and styrene (6.6 mL, 5.8×10$^{-3}$ mol) may be added. The polymerization of styrene may be allowed to proceed in some examples for more than 2 hours, and in other examples, for between about 3 and about 6 hours. Subsequently, the polymerization can be terminated with 10 mL methanol, the system may then be warmed to room temperature, concentrated by rotary evaporation, and the precipitated into about 1 L methanol. The methanol may then be decanted, the product then dissolved in hexane, and then the product can be washed with 5% aqueous sodium bicarbonate and water. The organic phase may be dried over magnesium sulfate overnight, the solids may then be separated by filtration through fine sintered glass, and the solvent can be evaporated by rotary evaporation. The product, hyperbranched OαMeSt-g-P(IB-b-St), may be dried in a vacuum oven at 50° C. for about 2 days. Structural, molecular, and mechanical characterizations may be conducted by $^1$H NMR spectroscopy, GPC, and universal tensile testing methods. The results of this experiment would show that if the time of the termination of styrene polymerization is extended to 3 to 6 hours after the complete consumption of the styrene, processible hyperbranched OαMeSt-g-P(IB-b-St) can be obtained with increased strength and modulus.

In light of the foregoing, it should be appreciated that the present invention significantly advances the art by providing a novel structure and synthesis of a star block copolymer and a novel star block copolymer-based thermoplastic elastomer that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A method of producing a star block copolymer comprising (a) a core component having a styrene oligomer or α-methyl styrene oligomer; and (b) arms emanating from the core component wherein the arms are poly(isobutylene-block-styrene) diblock copolymers, the method including the steps of:
  a. cationically synthesizing the styrene oligomer or α-methyl styrene oligomer;
  b. acetylating the styrene oligomer or α-methyl styrene oligomer to form a styrene oligomer or α-methyl styrene oligomer with acetyl groups;
  c. converting the acetyl groups to cumyl hydroxide groups;
  d. undertaking living carbocationic polymerization of isobutylene to form polyisobutylene blocks; and
  e. undertaking living carbocationic polymerization of styrene to form polystyrene blocks at an end of each polyisobutylene block to provide the poly(isobutylene-block-styrene) diblock copolymer arms.

2. The method of claim 1 wherein the step of cationically synthesizing includes the steps of:
  adding a Friedel Crafts acid co-initiator to a styrene monomer or an α-methyl styrene monomer in bulk or in solution.

3. The method of claim 2 wherein the Friedel Crafts acid co-initiator is selected from the group consisting of $TiCl_4$, $AlCl_3$, $AlBr_3$, $BF_3$, and $SnCl_4$.

* * * * *